Figure 1:
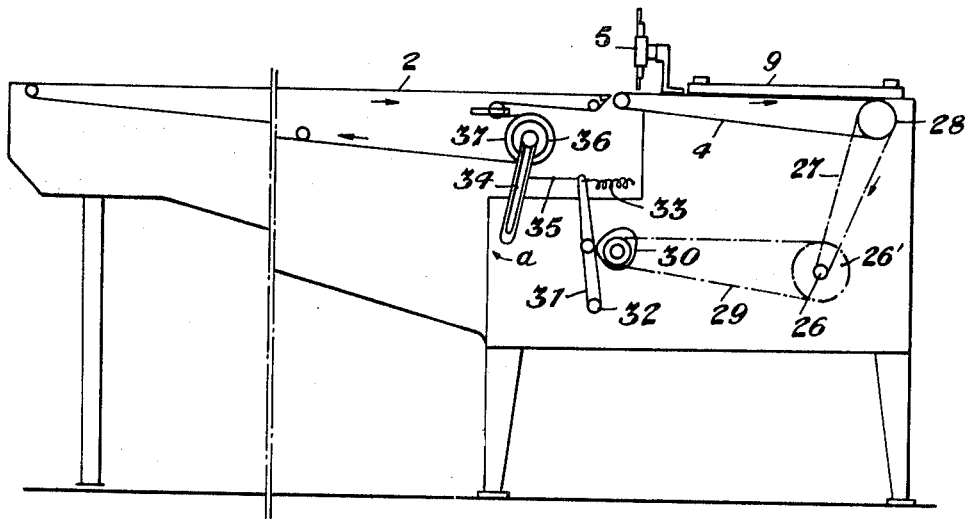

United States Patent

[11] 3,601,240

| [72] | Inventor | Antonio Dominici |
| | | 8, Via Ruggero d'Andreatte, Perugia, Italy |
| [21] | Appl. No. | 8,338 |
| [22] | Filed | Feb. 3, 1970 |
| [45] | Patented | Aug. 24, 1971 |
| [32] | Priority | Feb. 3, 1969, July 18, 1969 |
| [33] | | Italy |
| [31] | | 34670A/69 and 38776A/69 |

[54] DEVICE FOR ALIGNING AND DISPOSING ACCORDING TO THEIR LONGER DIMENSION ARTICLES INCOMING IN AN UNORDERED ROW
14 Claims, 7 Drawing Figs.

[52] U.S. Cl. .................................................. 198/20, 198/30, 198/33 AB
[51] Int. Cl. ....................................................... B65g 47/00
[50] Field of Search............................................. 198/33 R, 20, 30

[56] References Cited
UNITED STATES PATENTS

| 2,949,179 | 8/1960 | Busse .......................... | 198/30 |
| 3,247,981 | 4/1966 | Johnson ....................... | 198/33 X |
| 3,375,916 | 4/1968 | Greiner ....................... | 198/33 AB |

FOREIGN PATENTS

| 1,087,895 | 10/1967 | Great Britain................ | 198/30 |

Primary Examiner—Richard E. Aegerter
Assistant Examiner—Douglas D. Watts
Attorney—Browdy and Neimark ABSTRACT: The device aligns a large number of randomly spaced articles being fed continuously or discontinuously along a wide or narrow front. An intermittently operating conveyor transfers a group of randomly spaced articles to a second continuous conveyor, on which the articles can be moved forward only on consent of a barrier which retains said articles upon the second conveyor and lets them free to proceed only one after the other, towards a movable guide which directs them in a row to a last conveyor which aligns and orients them definitely.

DEVICE FOR ALIGNING AND DISPOSING ACCORDING TO THEIR LONGER DIMENSION ARTICLES INCOMING IN AN UNORDERED ROW

In the line production of a large number of articles there arises the necessity of arranging and aligning said articles which come from production or forming machines in an orderless row, for the purpose of feeding them to successive machines which require orderly rows of said articles. This requirement is particularly felt in the production of pressed products, especially of sweets, such as chocolates or candies, which in order to be enclosed into their protective or ornamental wrappings and successively placed into boxes, must reach the relating machine in a well defined, orderly and continuous array.

For small productions this could be achieved by aligning the articles by hand, or, if the articles arrived already prearranged in orderless rows, it was possible to obtain an actual aligning by means of successive belt conveyors having different speeds and directions. However, there remained the problem of obtaining orderly rows when the articles arrived grouped in a chaotic and random manner, especially when they were advancing in a wide front.

The present invention resolves in a definitive manner this problem, whatever the manner in which the articles travel i.e. in a continuous or discontinuous feed, along a wide or a narrow front, independently of whether they are more or less arranged in an orderly row or in complete confusion. According to the invention this is obtained by a device which, although being of a small size, permits to obtain a high production speed. In the present device, an intermittently operating conveyor transfers a group of articles to a second continuous conveyor, on which the articles can be moved forward only on consent of a barrier which retains said articles upon the second conveyor and lets them free to proceed only one after the other, towards a movable guide which directs them in a row a last conveyor which aligns and orients them definitively.

Figure 6:
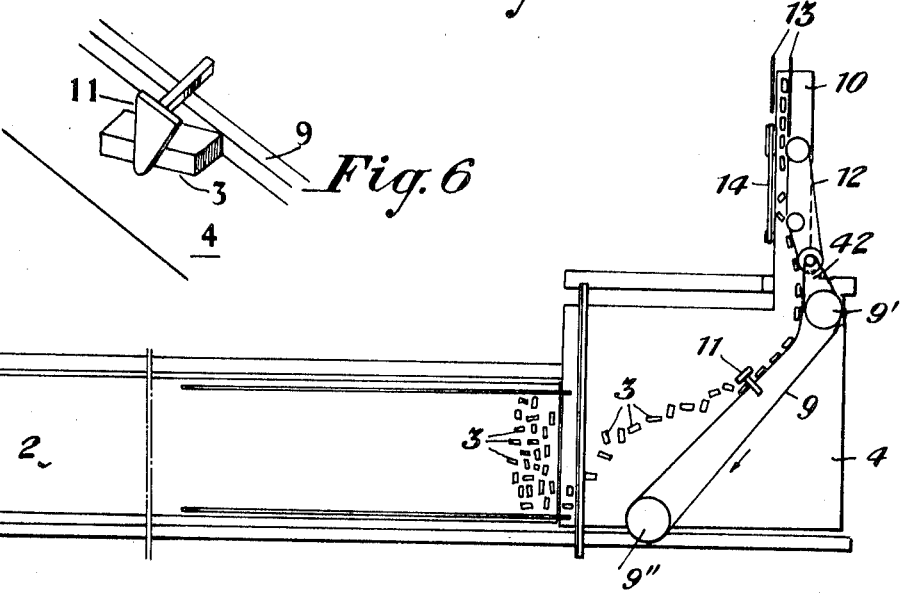
Figure 2:
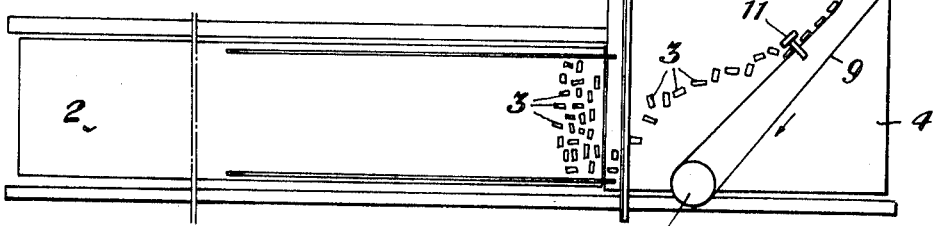
Figure 3:
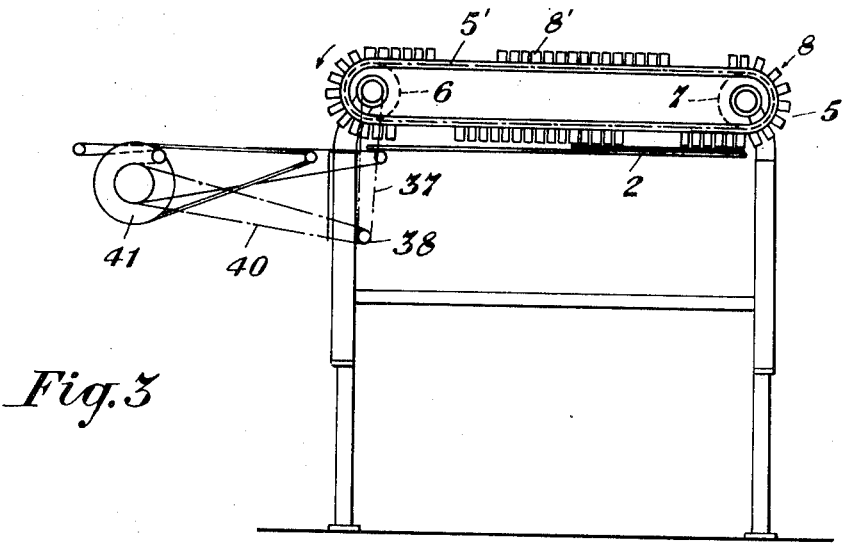
Figure 4:
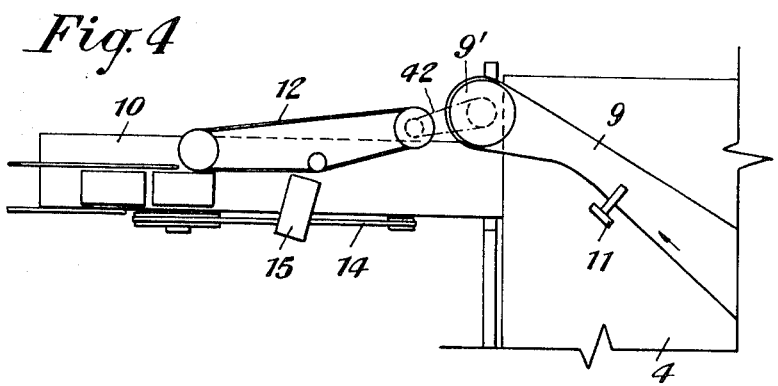
Figure 5:
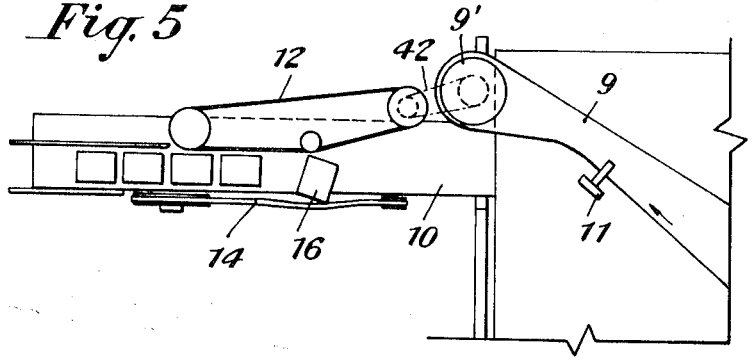
Figure 7:
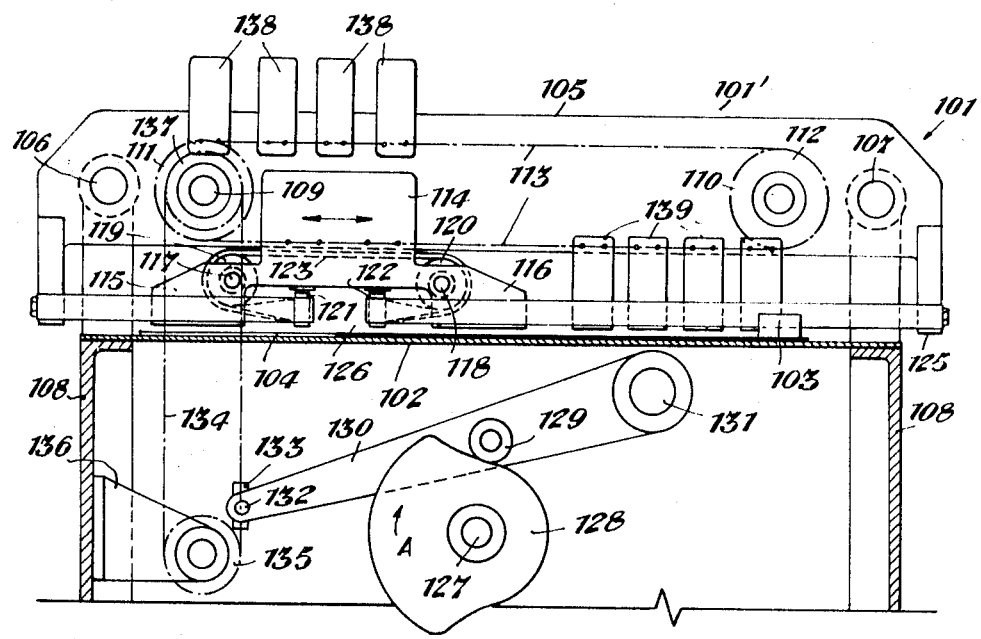

An embodiment of the invention will now be described with reference to the attached drawings, wherein:

FIG. 1 is a lateral view of the embodiment.
FIG. 2 is a top view of the embodiment.
FIG. 3 is a front view of the embodiment showing the belt which carries the movable barriers.
FIG. 4 shows the system for orienting relatively oblong articles according to the longer dimension.
FIG. 5 shows an arrangement for orienting not very oblong objects in a longitudinal sense.
FIG. 6 is a front view of a detail of FIGS. 2, 4 and 5.
FIG. 7 is a schematic front view of another embodiment.

With reference to FIGS. 1, 2 and 3, an orderless row of articles, such as chocolates or candies, is fed into a belt conveyor 2 and advances in a discontinuous, stepwise manner. The articles 3 on belt 2 are fed to a successive continuously moving conveyor belt 4. A chain or belt track 5 is placed transversally to said continuous belt 4 (see FIG. 3). This chain track rotates around two pinions 6 and 7, and is provided with barriers 8 (four in FIG. 3) each barrier being formed by series of closely arranged stops 8'. The length of each barrier equals the width of the front of advancement of the articles conveyed on belt 2. Between successive barriers there is left a gap 5'. These gaps 5' form passages through which the articles to be aligned can proceed, while they cannot proceed through the barriers 8. The belt 5 is placed above the continuous belt 4 and in front of the discontinuous belt 2, at such a distance therefrom, that between the beginning of belt 4 and track 5 there is just sufficient space for a transversal or frontal row of articles, irrespectively of whether this row is orderless and with the articles oriented in a random manner. Therefore this distance must be adjustable when the device according to the invention must be used for the alignment of articles of different sizes.

The discontinuous belt 2 has a feed equal to the above defined distance and therefore, by any known means, even this feed must be rendered variable in order to adapt it to the alignment of articles of different sizes.

At each step, the belt 2 will place upon the continuous belt 4, in front of the track 5, an orderless row of articles. Each step of belt 2 is timed with the continuous motion of track 5 so that the step occurs when the barrier 8 is just in front of said belt, so that the row of articles discharged upon the continuous belt 8 is retained on it by the barriers 8. However, because of an anticlockwise continuous rotation of track 5 (see arrow in FIG. 3) the barrier will gradually move to the right and the articles will now be able to pass in succession, one at a time and beginning from those at the left side of the belt 2, through the gap 5' following the barrier 8. This movement is caused by the continuous belt 4. When the gap 5' has traveled throughout the width of the belt 2, all articles have been entrained and since the successive barrier will now be moving in front of the belt 2, the latter will complete another step to bring another row of objects upon the continuous belt 4. The timing of the movement between the belt 2 and track 5 must therefore be such, that each step of the belt 2 corresponds to a sweep of the track 5, the term "sweep" defining in this case the distance between the beginning of two successive barriers, and the movement will be timed so, that each step ends when a barrier 8 completely blocks the belt 2.

The articles passing through gap 5' are conveyed by belt 4 until they strike a conveyor belt 9 rotating, at an angle with respect to belt 4, around two vertical pinions 9' and 9''. This belt 9 rotates in a clockwise sense, at a speed which is greater than that component of the speed of the articles 3 on belt 4 which is parallel to said belt 9, in order to space apart articles travelling too close to each other. Furthermore it is necessary to adjust this speed so that the last article which has passed through a gap 5' has already been entrained by belt 9 beyond the point at which the first article passing through the next gap will hit said belt, in order to prevent any heaping, on said belt 9, of the articles coming from next gaps. Owing to the fact that the articles strike the belt 9 in succession, in the measure in which they are permitted to pass gap 5', they place themselves in an orderly array along said belt 9 and are conveyed by it, in substantially uniform intervals, towards an aligning and output belt 10.

To dispose oblong articles with their longer side in the direction of travel of belt 9, along their path on said belt guide a check element 11 is positioned, at a distance from it which is equal or slightly larger than the shortest side of said oblong articles. This check element 11 is made oscillatable to yield when struck by the articles, so as to eliminate the possibility of damaging them. From belt 9 the articles are conveyed to a belt 12 which is also rotating in a vertical plane. Belt 12 is positioned on belt 10 and moves with the same speed. Said belt 12 leads the articles towards a channel defined between two guides 13. However, before entering this channel, it is necessary to definitely orient those articles which had not been accurately oriented on guide 9.

To this end (FIGS. 4 and 5) a belt 14 rotates in a vertical plane laterally to belt 12. The distance between these two belts 12 and 14 must equal the shorter size of the articles which are forced to pass between them. The speed of belt 14 is greater than that of belt 12. Said belt 14 can be used in two manners, either at a level of the output belt 10 or at a level slightly above it. In the first case (FIG. 4) it is applied when the article (here indicated at 15) has a comparatively strongly pronounced oblong form. In that case the article, when it is not yet oriented with its longer side in the direction of motion of belt 12, will project beyond the edge of belt 10 and thereby will come in a superficial contact with belt 14 which, owing to its greater speed with respect to belts 12 and 10, will propel the projecting part of the article until arranging it in the correct sense.

The second case (FIG. 5) is applied when there is very little difference between the longer and shorter sides of the article (here indicated at 16). Since, as already stated, the belt 14 is positioned above the plane of belt 10, the projecting edge of article 16 will be caught between belts 12 and 14, but, since the latter travels at a higher speed, this edge will be entrained forward and rotated around the edge contacting belt 12, until it is oriented in the correct direction. Either arrangement will permit that a regular row of perfectly oriented articles passes through the guides 13.

The articles to be aligned can be placed on belt 2 in any manner. They can be transferred on said belt either in batches supplied by the forming machines, or in a continuous manner.

The device according to the invention can be actuated in various manners. As shown in FIG. 2, a drive shaft 26 rotates through a belt or chain 27 the driving drum 28 of the continuous belt 4. The stepwise feed of belt 2 is obtained through a chain 29 driven by a pulley 26' and rotating a cam 30 which oscillates a lever 31 fulcrumed in 32 and biased by a tension spring 33. Lever 31 actuates an arm 34 by means of a connecting rod 35, whose position on arm 34 is adjustable in order to be able to vary the travel of belt 2. Arm 34 is coupled to the drum 36 of the belt 2 by means of a unidirectional transmission 37, for instance through a ratchet wheel. Owing to this arrangement, the travel of belt 2 will be timed by the drive shaft 26.

Drive shaft 26 can also control the motion of track 5 through a 90° transmission towards a pinion 38 (FIG. 3) and a chain 39. The transmission must conform to the timing conditions precedently described. Said pinion 38 may control, through a chain 40, the drum 41 of belt 10. Belt 9 can be driven in any manner and belt 12 can be coupled to the motion of belt 9 through a chain 42. Obviously this is one of the many possible manners of obtaining the motion of the various components of this embodiment. Furthermore, the output belt 10 must not necessarily be at an angle with the continuous belt 4, but may be made parallel to it.

In the embodiment generally indicated at 101 in FIG. 7, the stepwise movable conveyor belt, shown here in cross section, is indicated at 102. Of the articles to be aligned, only one, indicated at 103, is shown for the sake of simplicity. The articles 103 are transferred from belt 102 to the already described continuous conveyor belt, here indicated at 104. In the figure, a large part of belt 104 is hidden to the view by the section of belt 102. Also in this embodiment the barrier assembly is positioned transversally to the direction of motion of the belts 102 and 104, and is placed at a distance from the beginning of belt 104 such as to leave approximately sufficient space for a single front row of articles, which row will be yielded by belt 102 in succession, one at a time, to belt 104. The barrier proper 101' comprises a body 105 rigidly fastened by two supports 106 and 107 to the machine frame 108. The barrier 101' also comprises two shafts 109 and 110; on shaft 109 there is keyed a sprocket wheel transmitting its motion, through an endless chain 113, to another sprocket wheel 112 keyed on shaft 110. Carriage 114, guided by any known and therefore not represented means, is fastened to the lower stretch of chain 113. At each end, carriage 112 presents lower ears 115 and 116, in which are mounted pins 117 and 118 on which rolls 119 and 120 are freely rotatable. Intermediate said ears 115 and 116 carriage 114 also carries two additional freely rotatable rolls 121 and 122, which extend vertically downward. In this embodiment the barrier consists of a strip 123 which is anchored, corresponding to its two ends, on two lower extensions 124 and 125 of said body 105. As it is clearly visible from the figure, the strip 123 passes from extension 124, to which one of its ends is fastened, transversally and above the belt 104, having its plane perpendicular to that of the latter, thereafter passes around roll 121, thereafter, after being twisted 90°, around roll 119, then for a given stretch behind carriage 114, thereafter around roll 120 and after a second twist of 90°, on roll 122 and finally, after a last stretch coinciding with the prolongation of said first stretch, to extension 125 to which its other end is fastened. Owing to this arrangement, the strip 123 leaves free a gap 126 between rolls 121 and 122. The device is driven by a drive shaft 127 upon which is keyed a cam 128 which is constantly engaged (by any known and therefore not represented means) with a rotatable roll 129 carried by an arm 130 which is fulcrumed, correspondingly to one of its ends, to a pivot 131 carried by the frame 108. Correspondingly to its other end, said arm 130 is linked to a pin 132 which is rigid with a block 133 anchored to an endless chain 134. The latter rotates on a sprocket wheel 135 (which is rotatably mounted in a bracket 136 fastened to frame 108) and on a sprocket wheel 137 keyed to the shaft 109 mounted on the body 105.

On the chain 113 are fastened, as shown in the figure, two groups of plates, respectively indicated at 138 and 139.

The operation of the device will now be described with reference to the FIG. 7, where the barrier is represented at one end of its stroke, wherein the carriage is shown at the left end of its stroke. At this point, a row of articles 103 has already been transferred to the beginning of belt 104 by the belt 102. The articles are prevented from continuing their path by the stretch of ribbon 123 which extends from roll 122 to its anchorage 125. This stretch of ribbon 123 is conveniently backed on its rear surface, (against the pressure exerted on its front surface by the articles) by the already mentioned plates 139 carried by chain 113.

Now the rotation of cam 128 (which is suitably timed with the working of the other component devices in any known and therefore not described manner) causes the clockwise rotation (as seen in FIG. 1) of arm 130 around the shaft 131, and thus the anticlockwise rotation of chain 134 and consequently the anticlockwise rotation of chain 113. The latter entrains therefore from left to right (as seen in the figure) the carriage 114, and thereby the gap 126 between rolls 121 and 122 of carriage 114 will progressively shift from left to right, thus letting through in succession, in a regular and ordered manner, single articles 103.

It is clear that during this movement of the carriage the portion of ribbon 123 extending from point 124 to roll 121 will gradually increase while the portion between roll 122 and fastening point 125 will gradually become shorter. Once it has reached the right end of its stroke, the carriage 114 will remain inoperative for a time determined by the inoperative turn of cam 128, and in the meantime the belt conveyor 102 will advance one step and transmit to the conveyor 104 a second row of articles 103. It must be noted that in this position the portion of ribbon extending between the point of fastening 124 and roll 121 is now backed on its rear surface by the group of platelets 138. At this point the cam 128 and the arm 130, with its relating chain drives 134 and 113, will cause the return stroke, from right to left, of carriage 114 and therefore of gap 126, to which the articles 103 of said second row will pass in orderly succession. After the carriage has reached its left end of stroke, it will stand still during the next inoperative rotation of cam 128, and in the meantime the belt 102 will transfer to belt 104 a third row of articles, whereafter the carriage 114 will again be shifted to the right, and so forth.

It is clear that during the reciprocating movement of carriage 114 the portion of ribbon extending in front of the articles 103 remains motionless in its position with respect to the latter, thereby eliminating any possibility of damage by friction between said articles and the ribbon.

It is to be noted that in the two end positions of carriage 114, it is preferable that one part of gap 126 remains facing the marginal portion of belt 102 (as shown in the figure), in order to gain time or to let pass through said gap the first article 103 of the row right at the beginning of the stroke.

Furthermore, by any suitable known and therefore not represented means, the speed of translation of carriage 114 in its travel from right to left (with respect to the figure) approximately equals one half of the speed of translation of said carriage in order to permit that the single articles 103, passing through gap 126 in the travel of the carriage from right to left reach regularly, entrained by the conveyor 104, the successive movable guide 9 shown in the preceding figures, so that any single article 103 may have the time to be advanced from said guide over a stretch which is sufficient to permit the successive article to reach said guide without interfering with the preceding article, that is when the latter has already surpassed the point where the successive article will strike the guide.

According to a modification of the present invention, the function of the plates 138 and 139 could be carried out by said carriage 114, by extending the ears 115 and 116 suitably in a horizontal direction so as to act as backings for the relating portions of ribbon 123.

I claim:

1. A device for aligning and orienting articles, comprising: a continuously operating conveyor receiving said articles in batches from an intermittently operating feed conveyor; spaced-apart, movable barrier means forming gaps interposed between them, moving transversally in front of said continuous conveyor and obstructing it during the transfer of one batch from said intermittent conveyor to said continuous conveyor, said gaps moving transversally across the width of said continuous conveyor once said transfer is completed, to permit the articles of said batch to pass in single succession through said gaps; first movable guide means behind said barriers on said continuous conveyor and placed at an angle to its motion, to space apart the articles arriving through said gaps; check means to preliminarily orient said articles with their longer dimension parallel to their direction of travel; additional orienting means to accurately orient said articles in said direction and convey them to an output channel.

2. A device according to claim 1, wherein the barriers are positioned at a right angle to said continuous conveyor means, at a distance from its inlet end such as to leave, between said end and said barrier, a space just sufficient to contain one front row of articles.

3. A device according to claim 1, wherein behind said first guide means positioned obliquely to said continuous conveyor means is a second continuous belt conveyor, moving in a plane perpendicular to the latter at a speed higher than the speed component of said continuous conveyor which is parallel to said guide means.

4. A device according to claim 1, wherein said additional orienting means comprises a third conveyor moving in a plane parallel to said first guide means; a fourth belt conveyor, parallel to it and spaced therefrom at a distance shorter than the longest side of said articles and moving at a speed higher than said third belt conveyor.

5. A device according to claim 1, where the check means for preliminary orienting the articles is an oscillating arm adjustably positioned along said first guide means, to form therewith a passage approximating the shorter side of said articles.

6. A device according to claim 1, whose drive mechanism comprises a drive shaft, a cam keyed to said drive shaft and actuating, through an oscillating lever, an arm coupled to said lever and actuating, at each oscillation, a ratchet assembly, thereby controlling the stepwise rotation of a drum imparting the motion to said intermittently acting conveyor; a pulley on said drive shaft, transmitting its motion to the drums driving all continuous belt conveyors and the barriers.

7. A device according to claim 1, wherein the barriers are formed by a series of vertical stops carried by an endless track, the length of said series equaling the width of the frontal row of articles carried by said intermittent conveyor.

8. A device according to claim 7, wherein the speed ratio between the intermittent conveyor and the endless track is such that the time employed by the barrier and the successive gap to move across, the width of the continuous conveyor equals the time intercurring between two successive strokes of the intermittent conveyor.

9. A device according to claim 1, wherein the barrier comprises transversal surfaces which are motionless with respect to said continuous conveyor and form between themselves a gap which is movable across the width of said continuous conveyor by varying the respective lengths of said surfaces.

10. A device according to claim 9, wherein said surfaces are formed by a strip, whose two ends are fastened to stationary parts of the device and the gap is formed by passing said strip or ribbon around and over two vertical spaced apart rollers, said rollers being rigid with the carriage which is reciprocable throughout the width of said continuous conveyor.

11. A device according to claim 10, wherein said carriage is reciprocated by an endless chain actuated by a common mechanism, said carriage stopping at both ends of its travel or stroke during the inoperative rotation of said cam.

12. A device according to claim 11, wherein the speed of said carriage, in its travel from the end of stroke which is nearer to said first guide means, towards the end which is farther away from the latter, is approximately one half the speed of translation of said carriage during the other stroke.

13. A device according to claim 11, wherein the chain controlling the carriage carries two grooves of plates placed in such a manner as to back the rear surface of that part of the ribbon which is obstructing the path of said carticles.

14. A device according to claim 10, wherein the carriage, in addition to said vertical rollers, also carries two rollers rotating around horizontal axes lying above said rollers, the strip being passed around said vertical rollers and around said rollers rotating on horizontal axes, to leave free the gap formed between said two vertical rollers.